United States Patent
Edwards et al.

(10) Patent No.: US 7,133,872 B2
(45) Date of Patent: Nov. 7, 2006

(54) METHOD AND SYSTEM FOR UNIFYING COMPONENT METADATA

(75) Inventors: Warren Keith Edwards, San Francisco, CA (US); Mark Webster Newman, San Francisco, CA (US); Trevor Smith, San Francisco, CA (US); Jana Zdislava Sedivy, Palo Alto, CA (US); Karen Marcelo, San Francisco, CA (US); Shahram Izadi, Mountain View, CA (US); Jason Hong, Berkeley, CA (US)

(73) Assignee: Palo Alto Research Center Inc., Palo Alto, CA (US)

( * ) Notice: Subject to any disclaimer, the term of this patent is extended or adjusted under 35 U.S.C. 154(b) by 495 days.

(21) Appl. No.: 10/290,928

(22) Filed: Nov. 7, 2002

(65) Prior Publication Data

US 2004/0093341 A1    May 13, 2004

(51) Int. Cl.
 *G06F 17/30* (2006.01)
(52) U.S. Cl. .......................... 707/100; 707/3; 707/200; 713/1; 710/104
(58) Field of Classification Search ................ 713/1, 713/100; 707/100
See application file for complete search history.

(56) References Cited

U.S. PATENT DOCUMENTS 5,996,073 A * 11/1999 Lee et al. ...................... 713/1

2003/0200222 A1 * 10/2003 Feinberg et al. ............ 707/100

OTHER PUBLICATIONS

U.S. Appl. No. 09/838,933 to Edwards et al., titled System and Method for Enabling Communication Among Arbitrary Components dated Apr. 20, 2001.
U.S. Appl. No. 10/052,585 to Newman et al., titled System and Method for Providing Context Information dated Jan. 23, 2002.
U.S. Appl. No. 10/058,268 to Edwards et al., titled System and Method for Enabling Arbitrary Components to Transfer Data Between Each Other dated Jan. 29, 2002.
U.S. Appl. No. 10/212,377 to Newman et al., titled System and Method for Enabling Components on Arbitrary Networks to Communicate dated Aug. 7, 2002.

* cited by examiner

*Primary Examiner*—Charles Rones
*Assistant Examiner*—Belix M. Ortiz
(74) *Attorney, Agent, or Firm*—Park, Vaughan & Fleming, LLP

(57) ABSTRACT

A method and system for unifying component metadata includes components, such as computers, laptops or flat panel display devices and software entities, connected together by one or more networks. A method includes a first component, such as a laptop device, obtaining intrinsic metadata associated with one or more other components, such as a computer and a flat panel display device. The first component combines intrinsic metadata received from each component with extrinsic metadata of the first component, and provides the combined metadata to the other components, although the first component may also utilize the combined metadata. The components are able to obtain a consistent, unified view of the combined metadata without needing any prior programming and without requiring the use of centralized servers.

30 Claims, 6 Drawing Sheets

FIG. 6A
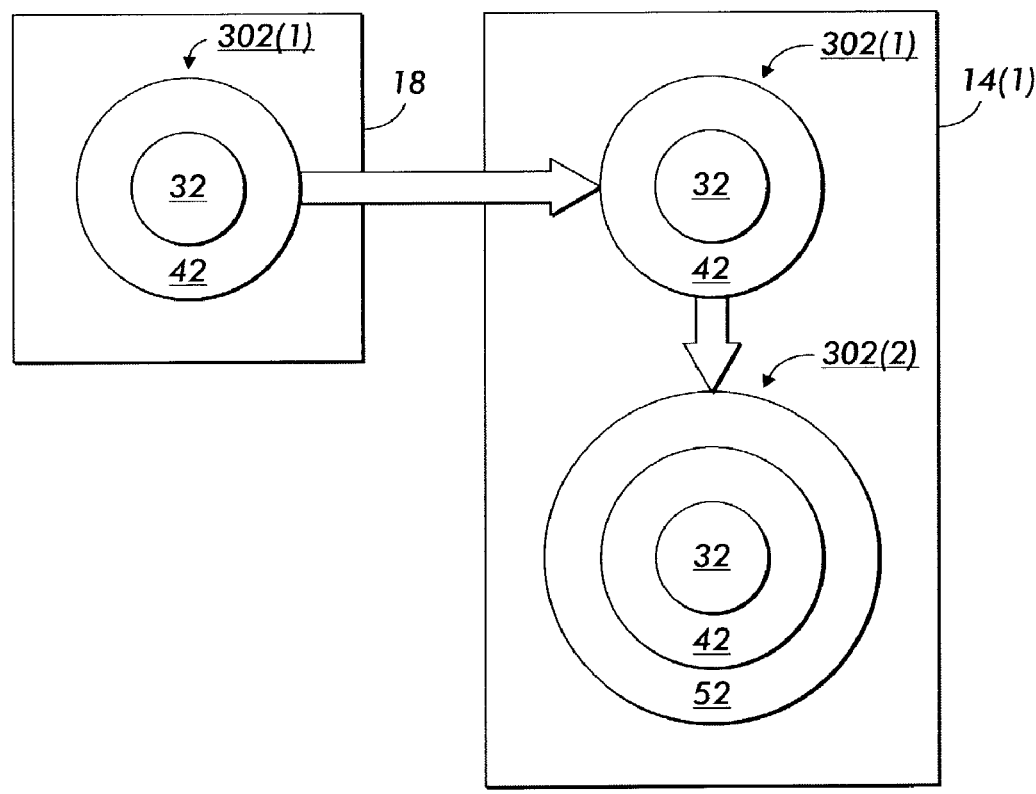
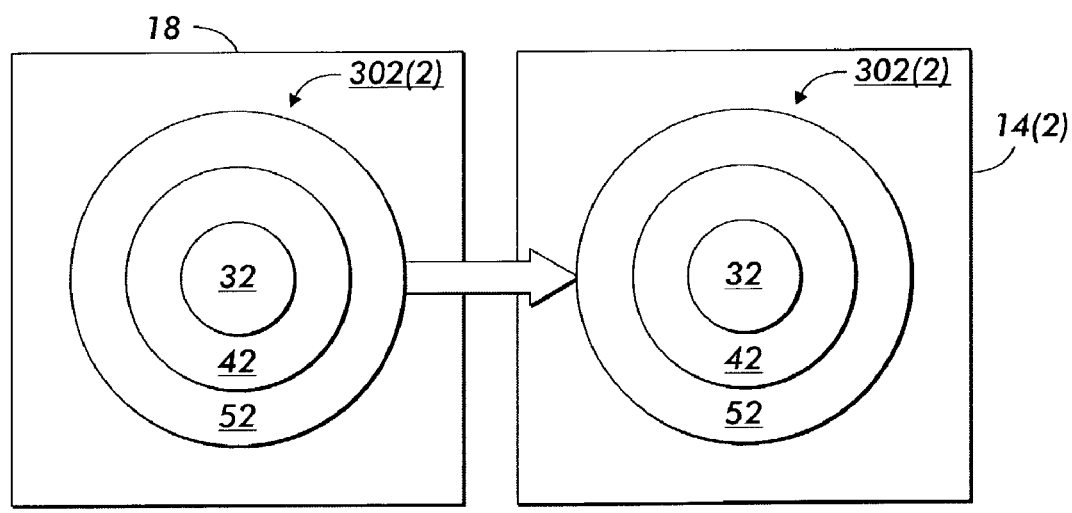
FIG. 6B

METHOD AND SYSTEM FOR UNIFYING COMPONENT METADATA

FIELD

This invention relates generally to communication methods and systems and, more particularly, to a method and system for unifying component metadata using a single representation that combines extrinsic metadata with intrinsic metadata.

BACKGROUND

In a ubiquitous or distributed network environment, components, such as devices, services, software entities and/or applications, may reveal to each other contextual information about themselves ("metadata"). For example, IRDA™ and BlueTooth™ devices may reveal what type of device they are, such as a printer, PDA, laptop, etc. JINI™ services may reveal their location on a network. This metadata provides descriptive information that is usually intended for human consumption. Metadata is frequently "intrinsic" with respect to the component, meaning that the data is resident within or is managed by the component itself. Moreover, components typically provide the same intrinsic metadata to their clients. Thus, intrinsic metadata normally can only be modified by a system administrator ("SA") or through reprogramming the component.

Often, however, people would like to impose or overlay additional or "extrinsic" metadata on top of the intrinsic metadata directly provided by the component. This extrinsic metadata could represent how a person describes a component, rather than how the component describes itself. For example, one may desire describing a particular printer service on a network as their "preferred printer." This metadata is extrinsic, since it describes the person's relationship to the printer. Of course, this type of relationship most likely will vary from person to person. There are several ways to provide extrinsic metadata, such as using a centralized server that stores metadata keyed by client or person. The server in this example provides the extrinsic metadata to the clients or users. Another approach uses interconnected servers to provide clients with "views" of document properties. Here, the views for a particular document may yield different results depending upon which server a client is accessing to view the document metadata.

But in either case, clients must have access to one or more centralized servers to access the extrinsic metadata. These centralized servers may not be accessible in a distributed or peer-to-peer network setting, for instance, and thus the components will not be able to access extrinsic metadata. When servers are available, however, one may be concerned with privacy, and thus may not trust having their metadata stored at an external source. Furthermore, clients in a network setting may desire access to the same metadata that is available to others, which is not possible in existing systems that use multiple servers to maintain different metadata views for a single component.

SUMMARY

A system in accordance with embodiments of the present invention includes a first component in a plurality of components, which is in communication with a second component in the plurality of components. The first component has a combination of intrinsic metadata associated with the second component and extrinsic metadata associated with the first component. The combined metadata is accessible to at least one of the plurality of components.

A method and a program storage device readable by a machine and tangibly embodying a program of instructions executable by the machine in accordance with embodiments of the present invention includes obtaining at a first component in a plurality of components intrinsic metadata associated with a second component in the plurality of components. The obtained intrinsic metadata is combined at the first component with the extrinsic metadata associated with the first component. The combined metadata is provided to at least one of the plurality of components.

The present invention enables components to keep their own, private extrinsic metadata about the components they encounter. Components may easily combine their extrinsic metadata with the intrinsic metadata of encountered components, resulting in unified metadata views. In the present invention, the same unified representation is used for both intrinsic and extrinsic metadata. The unified representations may be accessed by the combining components and other components. Components do not require explicit, prior programming to understand the unified representations of metadata that may contain intrinsic metadata and extrinsic metadata added by other components. Moreover, the use of centralized servers is not necessary in the present invention for storing a component's extrinsic metadata, as required in many existing systems. Thus, the present invention enables seamless sharing of metadata among components and provides consistent, unified metadata views.

BRIEF DESCRIPTION OF THE DRAWINGS

FIGS. 6A–6B are functional block diagrams of a portion of the system for unifying component metadata in accordance with embodiments of the present invention.

DETAILED DESCRIPTION

Figure 1:
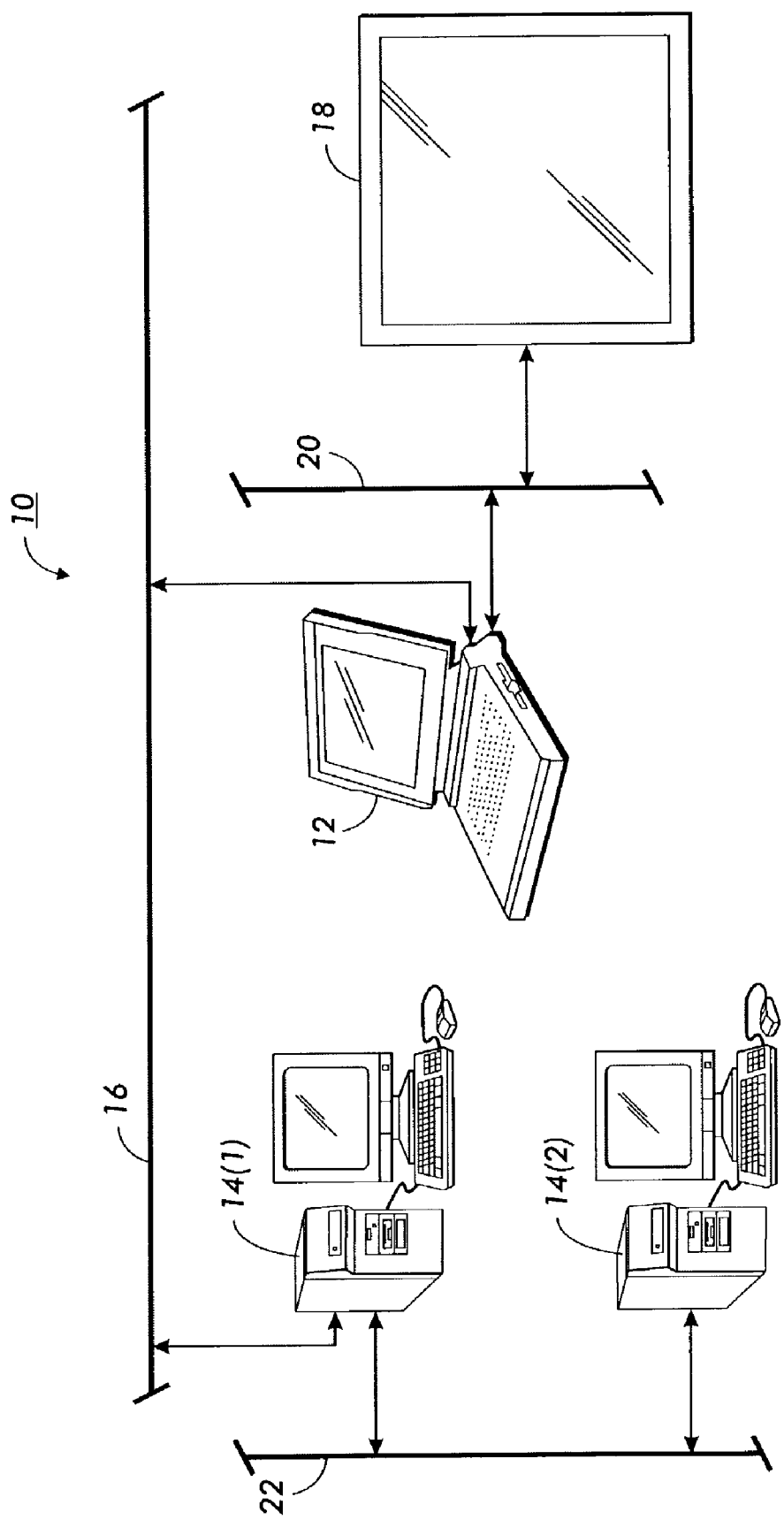
FIG. 1 is a block diagram of a system for unifying component metadata in accordance with embodiments of the present invention.
Figure 2:
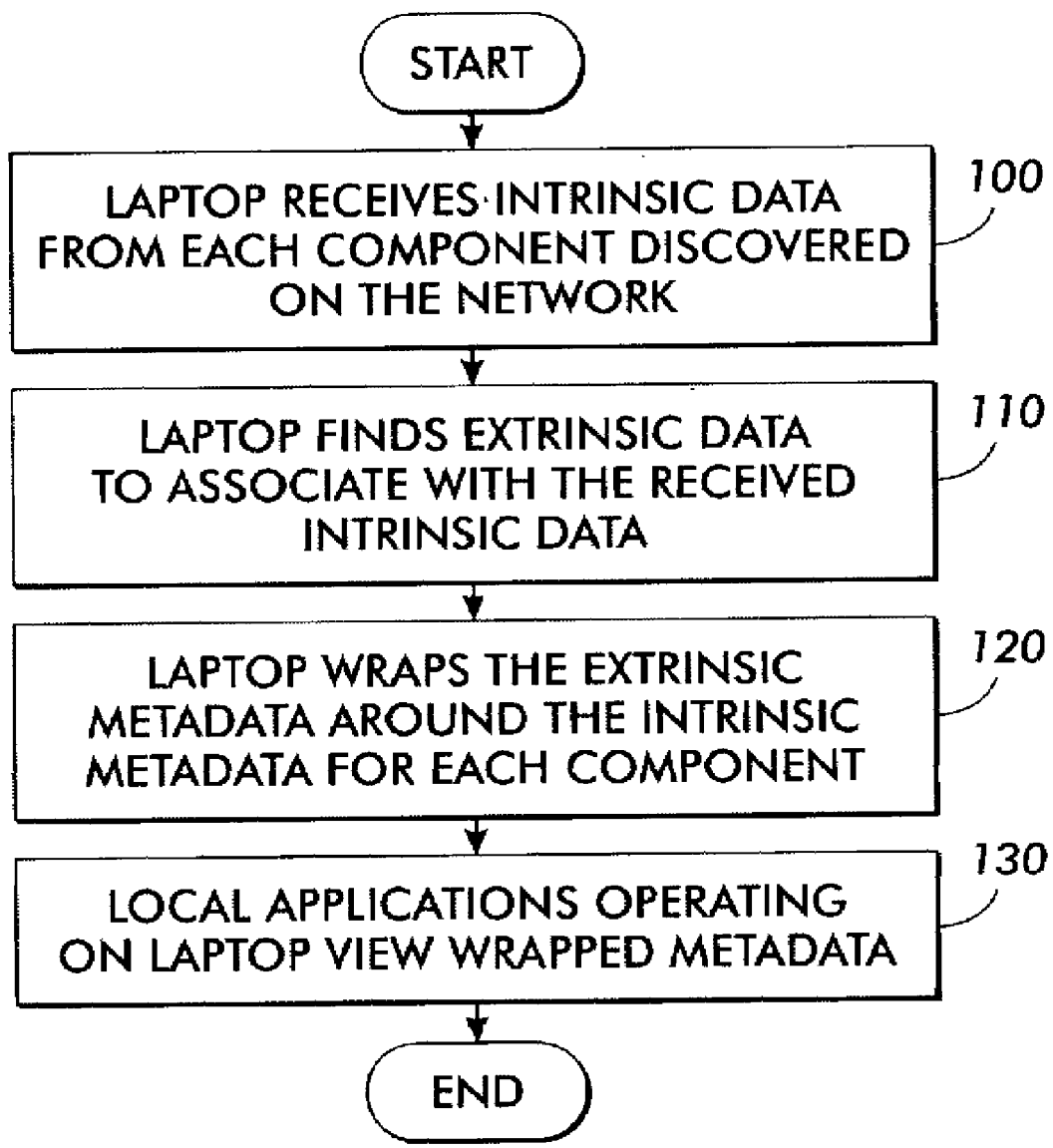
FIG. 2 is a flow chart of a process for unifying component metadata in accordance with embodiments of the present invention.

A method and system 10 for unifying component metadata in accordance with embodiments of the present invention is shown in FIGS. 1 and 2. In embodiments of the present invention, system 10 includes laptop 12, at least one of computers 14(1), 14(2) and display device 18 ("components"), although the system 10 may include different kinds and numbers of components. The system 10 combines intrinsic metadata obtained from components, such as the computers 14(1), 14(2) or the display device 18, with extrinsic metadata stored in a component, such as laptop 12, to form unified representations of metadata. Additional layers of metadata can be added to the unified representations by other components. The system 10 has a number of advantages, such as enabling components without explicit, prior programming to understand unified representations of metadata that are obtained from the components they encounter. Further, the system 10 does not require using centralized servers for storing a component's extrinsic metadata. Thus, the present invention enables seamless sharing of metadata among components and provides consistent, unified metadata views.

Referring more specifically to FIG. 1, laptop 12 comprises a portable computing device that performs a variety of functions, such as word processing, information processing and display, electronic messaging, telephony, facsimile transmissions, or networking, although other types of numbers of components can be used. Laptop 12 includes a processor, an I/O unit, a memory and mechanisms for reading data stored in the memory, which are coupled together by one or more buses, although other coupling techniques may be used. These elements are used by the laptop 12 to store and process instructions in accordance with embodiments of the present invention as described and illustrated further herein.

The memory is volatile memory, although non-volatile memory may also be used. The volatile memory comprises random access memory, although dynamic random access memory or flash memory may be used, while the non-volatile memory comprises a fixed data storage medium, such as a hard-disk, although a portable data storage medium may be used, such as a floppy-disk, compact-disc, digital-video disc, magnetic tape or optical disc. The memory stores instructions and data for performing the present invention for execution by the processor, although some or all of these instructions and data may be stored elsewhere.

The I/O unit has one or more ports to connect the laptop 12 to the first network 16 using a line based medium, such as coaxial cable. Moreover, the I/O unit includes one or more ports capable of receiving wireless signals, such as RF or infrared, to enable the laptop 12 to communicate with the second network 20. Since components, such as laptop 12, are well known in the art, the specific elements, their arrangement within laptop 12 and operation will not be described in further detail herein.

Computer 14(1) comprises a personal desktop computer, such as an IBM PC® using a Windows® operating system ("OS") platform, although computer 14(1) may comprise other types of systems, such as a Macintosh® or SUN Microsystems® machine, using a Macintosh® or Sun® OS Platform, although other types of platforms could be used, respectively, although other types and numbers of components can be used. Computer 14(1) includes a processor, an I/O unit, a memory and mechanisms for reading data stored in the memory, which are coupled together by one or more buses, although other coupling techniques may be used. These elements are used by the computer 14(1) to store and process instructions in accordance with embodiments of the present invention as described and illustrated further herein. The same types of volatile and non-volatile memory used by the laptop 12 may be used by the computer 14(1). The memory stores instructions and data for performing the present invention for execution by the processor, although some or all of these instructions and data may be stored elsewhere.

The I/O unit has ports to connect the computer 14(1) to both the first network 16 and the third network 22 using a line based medium, such as coaxial cable, although the I/O unit may also include ports capable of receiving wireless signals, such as RF or infrared, to enable the computer 14(1) to communicate with the first network 16 or the third network 22. Since components, such as computer 14(1), are well known in the art, the specific elements, their arrangement within computer 14(1) and operation will not be described in further detail herein.

The computer 14(2) is the same as the computer 14(1), except the computer 14(2) is connected to the third network 22 at its I/O unit. Further, the computer 14(2) is not connected to the first network 16 as shown in FIG. 1.

First network 16 comprises a public network, such as the Internet, which includes one or more local area networks ("LANs"), such as Ethernet™ networks, wide area networks ("WANs") and telephone line networks, although other types of public or private networks may be used, such as a proprietary organizational network spread out over several geographical locations. Moreover, first network 16 enables the laptop 12 and the computer 14(1) to communicate with each other, and any other components with access to the first network 16.

Display device 18 comprises a flat panel display that can display images representing text and/or graphics, although other types and numbers of components can be used. Display device 18 includes a processor, an I/O unit, volatile memory, non-volatile memory and mechanisms for reading data stored in the memory, although a hardware interface device including the above-described elements may be connected to the display device 18. In either case, the elements may be coupled together by buses, although other coupling techniques and devices may be used, and used by the display device 18 to receive and process data representing images to be displayed, and to store and process instructions in accordance with embodiments of the present invention, as described and illustrated further herein. The same types of volatile and non-volatile memory used by the laptop 12 may be used by the display device 18 to the extent size constraints of device 18 permit.

The memory stores instructions and data for performing the present invention for execution by the processors, although some or all of these instructions and data may be stored elsewhere. Additionally, the I/O unit has one or more ports capable of receiving wireless signals, such as RF or infrared signals, to enable the display device 18 to communicate with the second network 20, although the I/O unit may have one-or more ports capable of connecting the display device 18 to a line based network, such as the first network 16. Moreover, the display device 18 may include audio output devices, such as speakers. Since components, such as the display device 18, are well known in the art, the specific elements, their arrangement within the display device 18 and operation will not be described in further detail herein.

Second network 20 comprises a wireless network, such as a Bluetooth™ network, although network 20 may also include other types of wireless and wire-based networks. Moreover, second network 20 enables the laptop 12 and the display device 18 to communicate with each other, and any other components with access to the second network 20.

Third network 22 comprises a private network, such as an Ethernet® local area network, although other types of networks may be used. Moreover, the third network 22 enables the computers 14(1), 14(2) to communicate with each other, and any other components with access to the third network.

Components, such as laptop 12, computers 14(1), 14(2) and display device 18, are provided for exemplary purposes only. In embodiments of the present invention, the components may comprise any type of device or system that can store, process and execute instructions for performing one or more methods of the present invention as will be described in further detail herein, although the components may also comprise executable programs or other types of software entities that may be executed by or reside in a memory of a device or system. By way of example only, the components shown in FIG. 1 may also comprise scanners, cellular telephones, video camera recorders, audio input/output devices, copier devices, printer devices, remote control devices, appliances, and file systems or databases residing in a computer system. For ease of discussion and illustration, reference will be made generally to the laptop 12, computers 14(1), 14(2) and display device 18 throughout the embodiments of the present invention, rather than to the specific applications executing on those machines.

In embodiments of the present invention, the components in system 10, such as the laptop 12, computers 14(1), 14(2) and display device 18, each have stored in their respective memories programming to understand the semantics of a basic set of universal interfaces associated with proxy objects received from components, as disclosed in U.S. patent application Ser. No. 09/838,933, to Edwards et al., titled "SYSTEM AND METHOD FOR ENABLING COMMUNICATION AMONG ARBITRARY COMPONENTS," filed Apr. 20, 2001, which is hereby incorporated by reference in its entirety. The particular universal interface used is responsive to the needs of applications being managed by an operating system 13 running on the laptop 12, in this particular example, for particular services, such as printing a file being operated on by a word processing program. However, the basic semantic programming does not need to know the particulars of the specific services involved, only the semantics of the universal interfaces used in embodiments of the present invention as described further herein below.

The operation of the system 10 for unifying component metadata in accordance with embodiments of the present invention will now be described with reference to FIGS. 2–4. By way of example only, a user of the laptop 12 may be operating an application 204(1), shown in FIG. 4, such as an MS PowerPoint® slide show program. Moreover, the laptop 12 user may desire displaying the slide show on a suitable display device, such as the display device 18, for a number of reasons, including the device 18 being made by a particular manufacturer or being able to display color. The user may want to designate the closest suitable display device as their preferred display device while they are at their current location or for future visits to the location, but the laptop 12 at its current location may not have access to a centralized server, for example.

Thus, referring to FIGS. 1–2 and beginning at step 100, the laptop 12 is programmed to execute one or more discovery protocol(s) accessible to it to determine which components are present on any of the networks it has access to, such as the first network 16 and the second network 20, and to determine what their communication capabilities are. The laptop 12 may be programmed to automatically execute the discovery protocol(s) upon the operating system 13 detecting a user requesting a service or expressing a desire to establish a particular type of communication, such as a data transfer for transferring slides from a slide show operating on the laptop 12 to be displayed on the display device 18, although the laptop 12 may be programmed to execute the protocol(s) upon system start-up and initialization or to allow the user to manually initiate the discovery protocol(s), as disclosed in U.S. patent application Ser. No. 10/212,377 to Edwards et al., titled "SYSTEM AND METHOD FOR ENABLING COMPONENTS ON ARBITRARY NETWORKS TO COMMUNICATE," filed Aug. 7, 2002, which is hereby incorporated by reference in its entirety.

In embodiments of the present invention, laptop 12 at least discovers the computer 14(1) using a Jini™ system discovery protocol, although a number of other protocols may be used, such as UDDI or a simple lookup in a name server, for example, as disclosed in U.S. patent application Ser. No. 10/058,268 to Edwards et al., titled "SYSTEM AND METHOD FOR ENABLING ARBITRARY COMPONENTS TO TRANSFER DATA BETWEEN EACH OTHER," filed Jan. 29, 2002, which is hereby incorporated by reference in its entirety. Moreover, the laptop 12 discovers the display device 18 located on the second network 20 using a Bluetooth™ SLP discovery protocol, although a number of other protocols may be used as described above.

The computer 14(1) returns a computer proxy object (not illustrated) to the laptop 12, and the display device 18 returns a display device proxy object (not illustrated) to the laptop 12. Both of the proxy objects are stored in the laptop 12 memory. Each proxy object includes references to one or more universal interfaces associated with the particular component the proxy object is received from, such as the computer 14(1) and the display device 18, in this particular example, thereby making the interfaces and their respective methods, operations, instructions and data accessible to the receiving component, such as laptop 12. In embodiments of the present invention, one or more of the components in networks 16, 20, 22 are associated with one or more universal interfaces to effect a variety of communications, as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which has already been incorporated by reference in its entirety.

In embodiments of the present invention, the computer and display device proxy objects, and their associated interfaces, methods, operations, instructions and data, comprise mobile code, such as JAVA, although other languages may be used, such as Smalltalk, CLOS, ADA, or Object Pascal. Mobile code is executable content that can be transmitted to a component, such as laptop 12, computers 14(1), 14(2) or display device 18, where it may be executed. In embodiments of the present invention, the mobile code is object-oriented, which is a programming methodology that is well-known in the computer programming arts where data types, often referred to as classes, may be defined along with associated procedures or sets of instructions, although the mobile code may be procedure-oriented, logic-oriented, rule-oriented or constraint-oriented.

The laptop 12 inspects each received proxy object, such as the computer and the display device proxy objects, to determine which universal interfaces each proxy object implements. The laptop 12 determines that the computer and the display device proxy objects each implement at least a contextual interface, as disclosed in U.S. patent application Ser. No. 10/052,585 to Newman et al., titled "SYSTEM AND METHOD FOR PROVIDING CONTEXT INFORMATION," filed Jan. 23, 2002, which is hereby incorporated by reference in its entirety, although the proxy objects may implement a number of other universal interfaces to perform other types of communications, such as a data source interface and a data sink interface, as disclosed in U.S. patent application Ser. No. 09/838,933 to Edwards et al., titled "SYSTEM AND METHOD FOR ENABLING COMMUNICATION AMONG ARBITRARY COMPONENTS," filed Apr. 20, 2001, which has already been incorporated by reference in its entirety.

In this example, the computer and display device proxy objects each provide the laptop 12 with a custom implementation of the contextual interface that is specialized to communicate with the computer 14(1) and the device 18 using a TCP/IP communication protocol, decided upon by the developers of the computer 14(1) and display device 18, respectively, in this particular example. Other protocols can be used, however, such as RPC, CORBA, SOAP and RMI.

The contextual interface implemented by the computer proxy object includes a getContext( ) operation, which includes instructions, operations and data that can be understood and executed by laptop 12 to request a computer context object from the computer 14(1). The contextual interface implemented by the display device proxy object also includes a getContext( ) operation. Here, the getContext( ) operation includes instructions, operations and data that can be understood and executed by laptop 12 to request a display device context object from the computer 14(1).

Reference is made back to the example provided above of the user at the laptop 12. The user may access a user interface control panel window that graphically illustrates the discovered components, such as the computer 14(1) and the display device 18 in this particular example, on the laptop 12 display (not illustrated), as disclosed in U.S. patent application Ser. No. 10/212,377 to Edwards et al., titled "SYSTEM AND METHOD FOR ENABLING COMPONENTS ON ARBITRARY NETWORKS TO COMMUNICATE," filed Aug. 7, 2002, which has already been incorporated by reference in its entirety. Further, the user may use a mouse to select one or more icons representing the discovered components, such as the computer 14(1) and the display device 18, to request that the components' properties be displayed. In response, the laptop 12 invokes the contextual interfaces implemented by the computer and display device proxy objects. The methods, instructions, operations and data included in each invoked interface become available to laptop 12.

Laptop 12 is programmed to access the contextual interfaces through the computer and display device proxy objects using Java RMI, although a number of other protocols, such as RPC, CORBA, SOAP and TCP/IP may be used. Further, laptop 12 executes the getContext( ) operations included in the contextual interfaces implemented by the computer and display device proxy objects to request and retrieve the context objects (not illustrated) from the computer 14(1) and the display device 18, respectively, as disclosed in U.S. patent application Ser. No. 10/052,585 to Newman et al., titled "SYSTEM AND METHOD FOR PROVIDING CONTEXT INFORMATION," filed Jan. 23, 2002, which has already been incorporated by reference in its entirety.

The computer and display device context objects each include a remote reference to the contextual metadata, although the objects may directly include the metadata. The remote references may be a network address, network connection, or URL, to computer 14(1), display device 18, or other metadata sources, such as Web servers or databases (not shown). These remote references enable laptop 12 to use operations on the individual context objects, such as a getProperty( ) operation, to access current contextual metadata associated with computer 14(1) and display device 18, respectively. The getProperty( ) operation in each context object includes instructions that can be understood and executed by the laptop 12 to read the contextual metadata associated with computer 14(1) and display device 18. These instructions are communicated to the laptop 12 using a first protocol, such as a TCP/IP protocol, although other types of protocols may be used.

Figure 3:
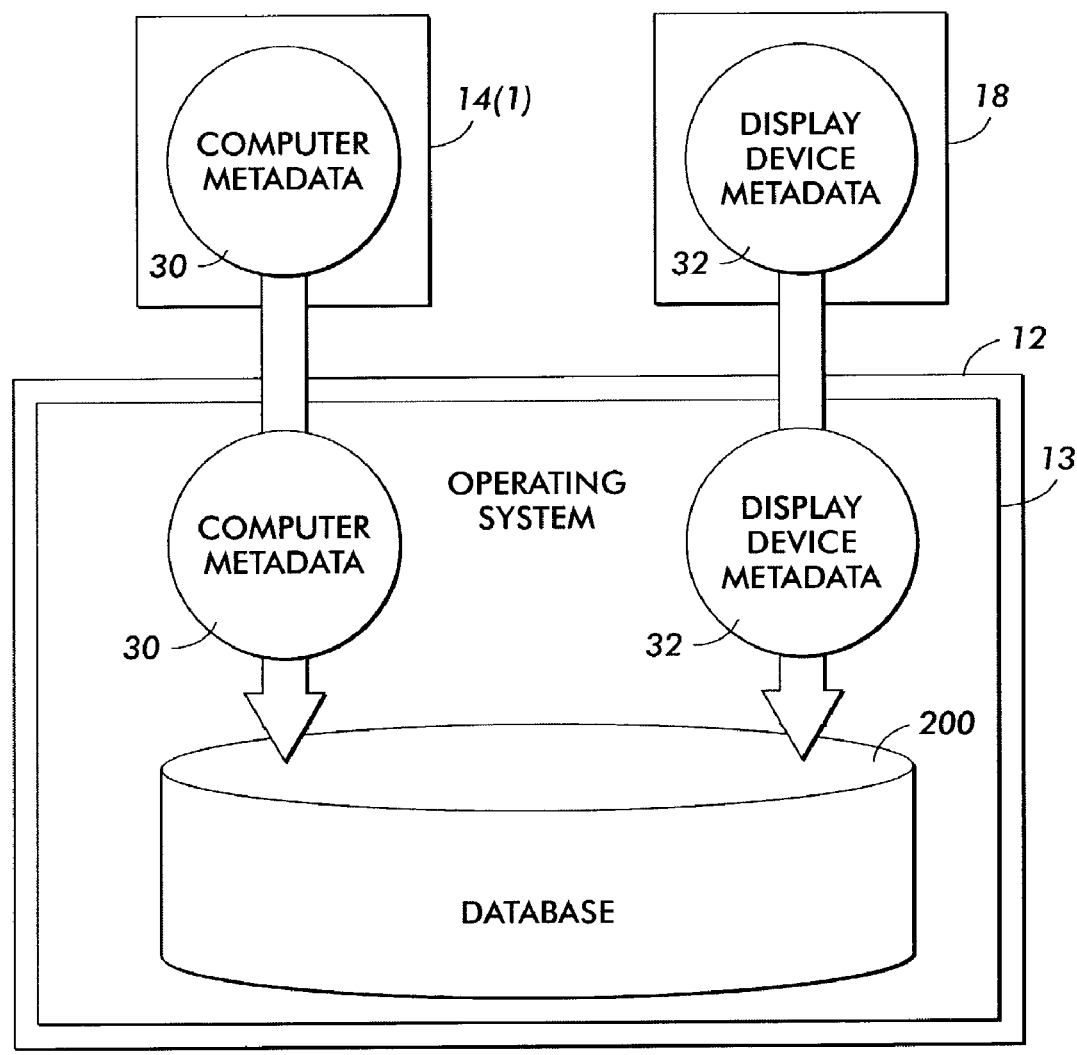
FIG. 3 is a functional block diagram of a portion of the system for unifying metadata in accordance with embodiments of the present invention.

Referring to FIG. 3 and continuing in step 100, the laptop 12 executes the instructions included in the getProperty( ) operations associated with the computer and display device context objects to retrieve computer metadata 30 and display device metadata 32 from the computer 14(1) and display device 18, respectively. The received metadata 30, 32 are stored in a memory of laptop 12 for further processing as described further herein below at step 110. Moreover, the stored metadata 30, 32 are logically organized in the laptop 18 memory as a multi-valued data structure, such as a hash table, although the metadata may be stored in a variety of ways, such as in an array of records. The metadata 30, 32 in this example include information that describes one or more aspects of the computer 14(1) and the display device 18, respectively, such as a manufacturer name, model, owner, history of use, location on the first network 16, administrative domain, information with respect to one or more users, or any other type of environment information that computer 14(1) and device 18 may be initially programmed by a developer to provide, for example.

The information included in the metadata 30, 32 is typically received as a set of key-value pairs organized in a hash table arrangement, although the information may be arranged in a number of other configurations. The key in each key-value pair is represented as a string mnemonic identifier that describes an attribute of the component, although numeric identifiers may be used. Moreover, keys are typically unique. The value in each key-value pair describes the particular key. By way of example only, a set of key-value pairs included in the display device metadata 32 may be organized in the manner shown below in Table 1:

TABLE 1

| INTRINSIC METADATA KEY | INTRINSIC METADATA VALUE |
|---|---|
| Service Type | Display Device |
| Manufacturer | NEC ® |
| Current Location | Room 14 |

The computer metadata 30 may be organized in the same manner as the display device metadata 32 described above, except the key-value pairs are particular to the computer 14(1).

At step 110, the laptop 12 maintains a database 200 associated with extrinsic metadata of the laptop 12. In this example, database 200 resides in the laptop 12 memory, although the database 200 may reside elsewhere. Moreover, the laptop 12 may access, read from, write to, and search the database 200 to perform the present invention as described herein. By way of example only, the laptop 12 extrinsic metadata stored in database 200 may include the following information shown below in Table 2:

TABLE 2

| COMPONENT TYPE | EXTRINSIC METADATA KEY | EXTRINSIC METADATA VALUE |
|---|---|---|
| Printer | Laptop's Favorite Printer Manufacturer | Xerox ® |
| Display Device | Laptop's Favorite Display Device Manufacturer | NEC ® |
| Computer | Laptop's Favorite Computer Manufacturer | IBM ® |

The laptop 12 finds extrinsic metadata in the database 200 to "wrap around" or combine with the stored display device metadata 32, as described further herein below at step 120. Moreover, the second and third columns in Table 2, labeled as "EXTRINSIC METADATA KEY" and "EXTRINSIC METADATA VALUE," represent new extrinsic metadata key-value pairs, respectively, that should be associated with metadata 32, as will be described further herein. The laptop 12 may be programmed to match extrinsic metadata in the database 200 with the information in metadata 32 in a variety of ways.

For instance and referring to the first column in Table 1, the laptop 12 may examine the metadata 32 to look for an "INTRINSIC METADATA KEY," such as the "Service Type" key. Moreover, the laptop 12 examines the "INTRINSIC METADATA VALUE" associated with the "Service Type" key and finds a "Display Device" value.

Referring now to the first column in Table 2, the laptop 12 may then examine the database 200 to look for a "COMPONENT TYPE" that matches the "Service Type" found above in Table 1. Here, the laptop 12 determines that Table 2 has extrinsic metadata for a "COMPONENT TYPE" that is a "Display Device." Referring to the third row in Table 2 associated with the "Display Device," the laptop 12 determines that the "Laptop's Favorite Display Device Manufacturer" key should be associated with the metadata 32, and hence the display device 18, and that the "EXTRINSIC METADATA VALUE" corresponding to that key, such as "NEC®," should be associated with the metadata 32 as well. In this example, the laptop 12 performs the same process described above to find extrinsic metadata stored in database 200 that will ultimately be combined with the computer metadata 30, as described herein below at step 120.

In the example provided above, the extrinsic metadata stored in the database 200 is matched with the metadata 30, 32 based on the "Service Type" key in metadata 30, 32. Additionally, the laptop 12 may match extrinsic metadata with the metadata 30, 32 based upon a unique component ID associated with computer 14(1), display device 18, or other components that may be discovered. For example, database 200 may include a list of specific component ID's and the extrinsic metadata that should be combined with the components' intrinsic metadata when they are encountered. Alternatively, the laptop 12 may match the extrinsic metadata stored in the database 200 with information included in the metadata 30, 32 based upon current contextual information included in the metadata 30, 32, such as the associated component's current location, or how it was discovered.

Still further, the laptop extrinsic metadata stored in the database 200 may be matched with the information included in the metadata 30, 32 based upon an operation a user of the laptop 12 is attempting or the data the user is manipulating. For instance, a component may be secure for some definition, such as supporting secure sockets for communicating, which may be expressed in the metadata 30, 32, or is otherwise known to the laptop 12. In this example, the extrinsic metadata that matches the metadata 30, 32 may include information indicating that the connection to the component is considered "Secure." Another example includes matching the information included in the metadata 30, 32 with the extrinsic metadata stored in database 200 based upon one or more attributes of the laptop 12 user, such as a user's explicit preference or the user's usage history. Here, the matched extrinsic metadata stored in the database 200 may specify key-value pairs that should be combined with metadata 30, 32 to indicate that the corresponding component 14(1) or 18 was "Recently Used" or is a "User's Favorite." Yet another example includes matching the extrinsic metadata stored in the database 200 with the metadata 30, 32 based upon external information, such as a recommendation or collaborative filtering service, or another component's unified metadata view of a service, which will be described in further detail herein below at step 430.

Figure 4:
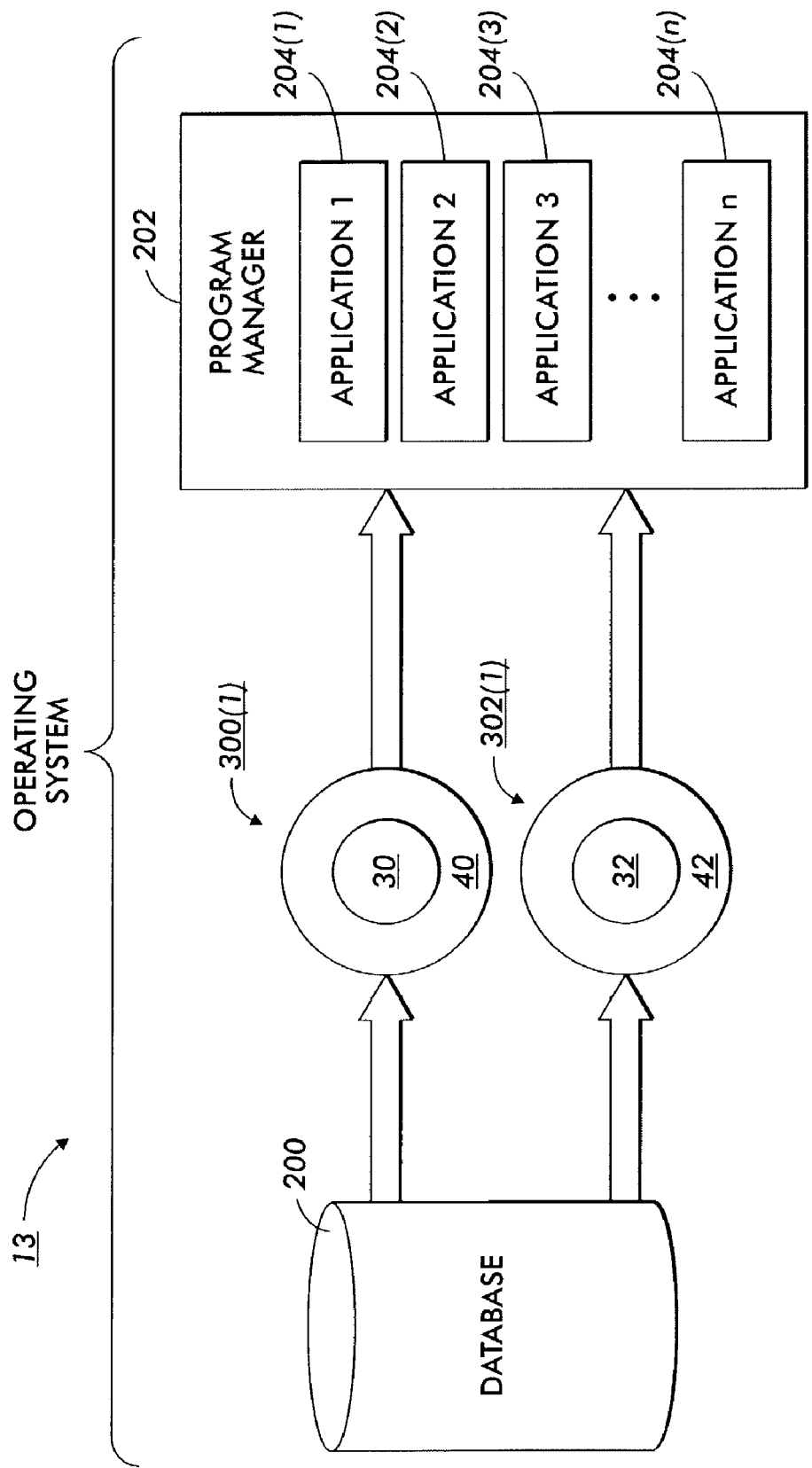
FIG. 4 is a functional block diagram of a portion of the system for unifying metadata in accordance with embodiments of the present invention.

At step 120 and referring to FIG. 4, the matching laptop extrinsic metadata associated with the computer 14(1) and the display device 18, found above at step 110 and shown here as computer first layer 40 and display device first layer 42, is combined with the metadata 30, 32, respectively, by the laptop 12. For instance, the display device first layer 42 is combined with the display device metadata 32 to form unified display device metadata 302(1), which is stored in a laptop 12 memory, although the unified metadata 302(1) may be stored elsewhere. Referring back to Table 1, which represents a set of exemplary key-value pairs included in the display device metadata 32, the laptop 12 replaces an "INTRINSIC METADATA VALUE" description for a particular "INTRINSIC METADATA KEY" with the matched laptop extrinsic metadata.

For example, metadata 32 may describe display device 18 as being a generic type of "Display Device," such as an "NEC®." Database 200 may include more specific information describing display device 18, such as describing a particular model of display device 18. In this example, laptop 12 would use information from database 200 to replace the "NEC®" value in metadata 32 with a more specific value that describes the specific model of display device, such as a "NEC® Color Monitor Model" value. Alternatively, additional key-value pairs may be added to the existing key-value pairs included in the metadata 32. In either case, the laptop 12 combines the computer first layer 40 with the computer metadata 30 to form unified display device metadata 300(1) in the same manner described above with respect to forming the unified display device metadata 302(1).

At step 130, a program manager 202 operating on the laptop 12 is programmed to access the unified metadata 300(1), 302(1) as they are needed by one or more applications 204(1)–204(n). Each of the applications 204(1)–204(n) are able to access and view the combined metadata without regard to which portions of the unified metadata 300(1), 302(1) originated from the metadata 30, 32, and which portions originated from the matched laptop extrinsic metadata first layers 40, 42, although the applications 204(1)–204(n) may reflect upon the unified metadata 300(1), 302(1) to determine which portions originated from the metadata 30, 32, and which portions originated from the first layers 40, 42.

Figure 5:
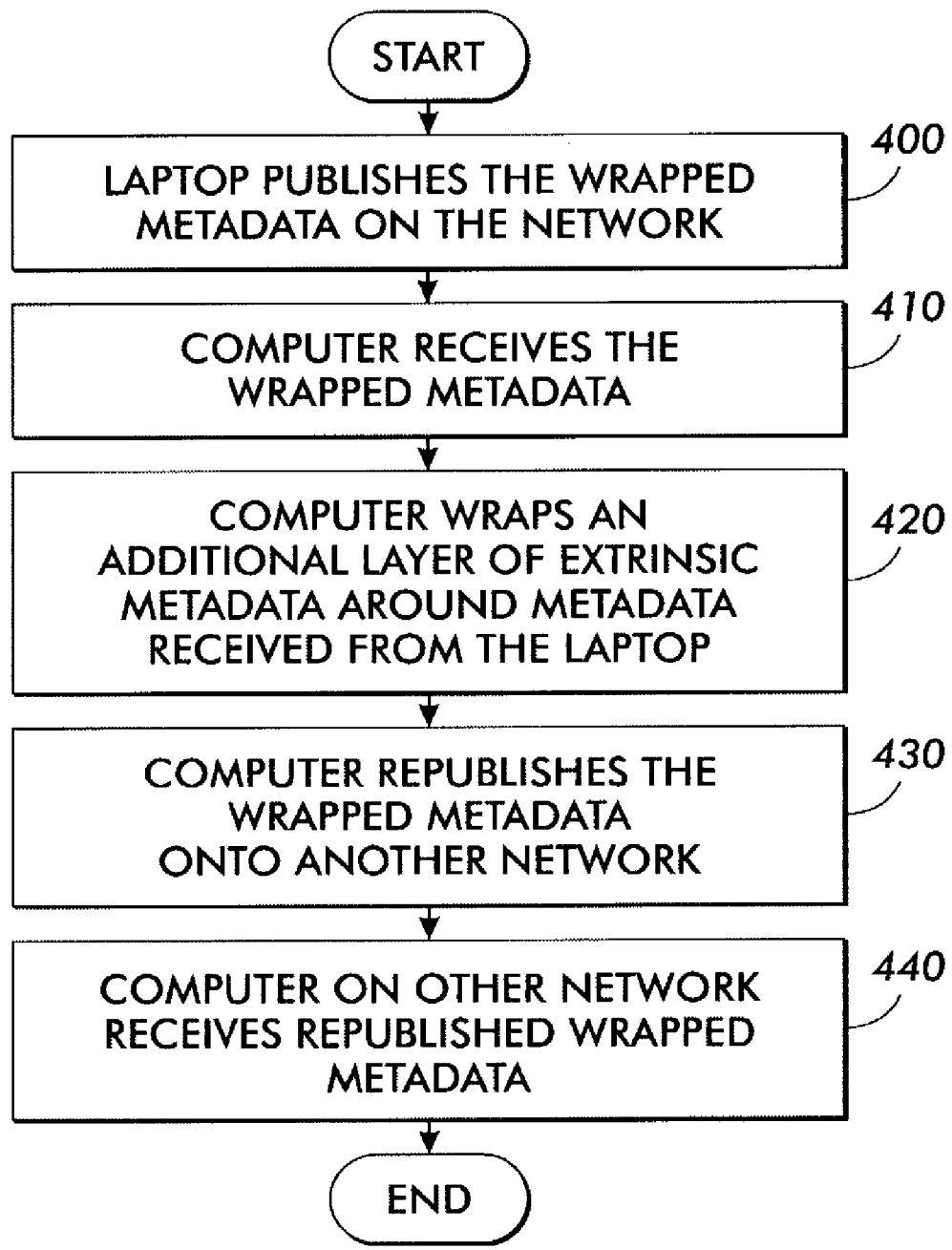
FIG. 5 is a flowchart of a process for unifying component metadata in accordance with embodiments of the present invention.

An alternative embodiment of system 10 will now be described. Like reference numbers in FIGS. 1–4 are identical to those in and described with reference to FIGS. 5–6. Referring back to FIG. 2, steps 100–130 are performed in the same manner as described above in connection with FIGS. 1–4. Referring to FIGS. 5–6 and at step 400, the laptop 12 makes the unified display device metadata 302(1), associated with the display device 18 and the second network 20, available to components on the first network 16, such as the computer 14(1). In this example, the laptop 12 executes the appropriate methods included within an interface for a Jini™ system discovery protocol to register the display device 18, and hence the unified metadata 302(1), although the display 18 and its associated unified metadata 302(1) may be registered with a lookup server. Registering the display device 18 with the discovery protocol makes the unified metadata 302(1) available to any of the components that can access the network 16 and the discovery protocol, such as the computer 14(1).

At step 410 and referring to FIG. 6A, the computer 14(1) performs a Jini™ system discovery protocol to discover components present on the first network 16, such as the laptop 12, in the same manner described above at step 100 with respect to the laptop 12 discovering components. Additionally, the computer 14(1) discovers components, such as the display device 18, which were registered with the Jini™ system discovery protocol as described above at step 400. The computer 14(1) receives a proxy object (not illustrated) from the laptop 12 and the newly registered display device 18. The computer 14(1) then invokes a getProperty( ) operation on the contextual interface implemented by the display device proxy object to receive a context object (not illustrated) from the display device 18. The context object may include the unified display device metadata 302(1), although the context object may include one or more references to the location of the intrinsic and the extrinsic metadata that were combined at step 120 to form the unified metadata 302(1). In this example, the reference to the location of the display device 18 intrinsic metadata would be the device 18. Moreover, since the laptop 12 contributed its extrinsic metadata to the unified metadata 302(1), the reference to the extrinsic metadata would indicate the laptop 12 as the source to retrieve the extrinsic metadata from.

At step 420, the computer 14(1) performs the same process as the laptop 12 described above in connection with step 110, except the computer 14(1) finds computer extrinsic metadata stored in a database of the computer 14(1) to match with the unified metadata 302(1). In this example, the computer 14(1) may reflect upon the unified display device metadata 302(1) and determine that "NEC®" is a preferred manufacturer of laptop 12 for display services, such as the display device 18. The computer 14(1) may add the display device second layer 52, which may include extrinsic metadata, such as "Default Display Device for Displaying Color Images to Laptop 12," for example. The computer 14(1) performs the same process as the laptop 12 described above in connection with step 120, except the computer 14(1) combines the display device second layer 52 with the unified display device metadata 302(1) to form unified display device metadata 302(2). Further, the computer 14(1) performs the same process as the laptop 12 described above in connection with step 130, except local applications operating on the computer 14(1) may access and view the unified display device metadata 302(2).

At step 430, the computer 14(1) performs the same process as the laptop 12 described above in connection with step 400, except the computer 14(1) registers the display device 18, along with the unified display device metadata 302(2), with a discovery protocol accessible to the computer 14(1), such as a Jini™ system discovery protocol, so that components on the first network 16 can discover the display device 18 and receive the unified display device metadata 302(2). Further, the computer 14(1) in this particular example may have access to another discovery protocol, such as UDDI, that may be executed by the computer 14(1) for discovering components on the third network 22. The computer 14(1) registers the display device 18, along with the associated unified display device metadata 302(2), with the UDDI discovery protocol and hence the third network 22. Thus, the display device 18 and the unified display device metadata 302(2) become discoverable to components on the third network 22, such as the computer 14(2).

At step 440 and referring to FIG. 6B, the computer 14(2) performs the same process as the laptop 12 described above in connection with step 100, except the computer 14(2) performs a discovery protocol to discover components present on the third network 22. The computer 14(2) performs a UDDI discovery protocol, although other protocols may be used, and discovers components, such as the computer 14(1) and the display device 18, which is registered with the UDDI discovery protocol as described above at step 430. The computer 14(2) receives a proxy object from the computer 14(1) and the newly registered display device 18, and invokes a getProperty( ) operation on the contextual interface implemented by the display device proxy object to receive the unified display device metadata 302(2) from the display device 18.

Thus, as described above at step 420, the unified display device metadata 302(2) may include additional extrinsic metadata, such as "Default Display Device for Displaying Color Images to Laptop 12," shown as second layer 52. The computer 14(2) performs the same process as described above in connection with steps 110–130, and one or more applications operating on the computer 14(2) may access and view the unified display device metadata 302(2). Reference is made back to the example provided earlier in connection with step 100, where a user of laptop 12 desires designating the display device 18 as their preferred display service. In this example, a user of the computer 14(2) may desire or need to know that the device 18 is the "Default Display Device for Displaying Color Images to Laptop 12," since the user of computer 14(2) may desire having slides from a slide show operating on the computer 14(2) displayed on a suitable display service for the laptop 12. Hence, the computer 14(2) user may view the unified display device metadata 302(2) and see that the display device 18 is the "Default Display Device for Displaying Color Images to Laptop 12."

The present invention provides a system 10 by which components, such as the laptop 12, combine intrinsic metadata obtained from other components, such as the computer 14(1) or the display device 18, with extrinsic metadata stored at the component, such as in a database 200 of the component, to form unified metadata views. The extrinsic metadata may be combined with intrinsic metadata by adding new metadata key-value pairs or by replacing existing key-value pairs, as described above in connection with one or more embodiments. In either case, the unified metadata views can be registered with one or more discovery protocols to make the metadata accessible to a number of components on one or more networks. Additional layers of metadata can be added to the unified metadata views by other components, which in turn can easily combine their own, additional extrinsic metadata therewith. In the present invention, the unified metadata views are used to represent both intrinsic and extrinsic metadata. Thus, components do not require explicit, prior programming to understand each type of metadata, such as intrinsic or extrinsic, included within the unified representation. Since components may retain their private, extrinsic metadata about the components they encounter, centralized servers are not required for storing the components' extrinsic metadata, as required in many existing systems. Furthermore, the present invention provides seamless sharing of intrinsic and extrinsic metadata between components.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A method comprising:

obtaining at a first network component in a plurality of network components intrinsic metadata associated with a second network component in the plurality of network components, wherein the intrinsic metadata includes descriptive information for the second network component which resides within or is managed by the second network component;

wherein a network component includes a network device or a network service;

combining at the first network component the obtained intrinsic metadata with extrinsic metadata associated with the first network component to form combined metadata, wherein the intrinsic metadata includes descriptive information associated with the intrinsic metadata which resides within or is managed by the first network component; and providing the combined metadata to at least one of the plurality of network components by communication over a network, wherein an application executing on the at least one of the plurality of network components uses the combined metadata to determine the application's operating parameters.

2. The method as set forth in claim 1 wherein the at least one of the plurality of network components:

obtains the combined metadata;

combines the obtained combined metadata with an additional layer of extrinsic metadata to form a multi-layered metadata combination; and provides the multi-layered metadata combination to at least one of the plurality of network components.

3. The method as set forth in claim 1 wherein the first network component is on a first network, and at least one of the second network component and a third network component in the plurality of network components is on a second network.

4. The method as set forth in claim 3 wherein at least one of the second network component and the third network component is on a third network.

5. The method as set forth in claim 1 wherein obtaining intrinsic metadata further comprises obtaining and executing a context object.

6. The method as set forth in claim 5 wherein the context object further comprises at least one mobile code instruction to retrieve the intrinsic metadata.

7. The method as set forth in claim 1 wherein combining the obtained intrinsic metadata with extrinsic metadata further comprises determining whether an identifier of a portion of the obtained intrinsic metadata matches another identifier of the extrinsic metadata.

8. The method as set forth in claim 1 wherein combining the obtained intrinsic metadata with extrinsic metadata further comprises replacing a portion of the obtained intrinsic metadata with the extrinsic metadata, an identifier in the combined metadata identifying the extrinsic metadata instead of the replaced portion of the obtained intrinsic metadata.

9. The method as set forth in claim 1 wherein combining the obtained intrinsic metadata with extrinsic metadata further comprises associating an identifier that identifies a portion of the obtained intrinsic metadata with the extrinsic metadata, the identifier identifying the portion of the obtained intrinsic metadata and the extrinsic metadata.

10. The method as set forth in claim 1 wherein providing the combined metadata further comprises registering the combined metadata with at least one discovery protocol.

11. A computer-readable medium having stored thereon instructions, which when executed by at least one processor, causes the processor to perform:

obtaining at a first network component in a plurality of network components intrinsic metadata associated with a second network component in the plurality of network components, wherein the intrinsic metadata includes descriptive information for the second network component which resides within or is managed by the second network component;

wherein a network component includes a network device or a network service;

combining at the first network component the obtained intrinsic metadata with extrinsic metadata associated with the first network component to form combined metadata, wherein the intrinsic metadata includes descriptive information associated with the intrinsic metadata which resides within or is managed by the first network component; and providing the combined metadata to at least one of the plurality of network components by communication over a network, wherein an application executing on the at least one of the plurality of network components uses the combined metadata to determine the application's operating parameters.

12. The medium as set forth in claim 11 wherein the at least one of the plurality of network components:

obtains the combined metadata;

combines the obtained combined metadata with an additional layer of extrinsic metadata to form a multi-layered metadata combination; and provides the multi-layered metadata combination to at least one of the plurality of network components.

13. The medium as set forth in claim 11 wherein the first network component is on a first network, and at least one of the second network component and a third network component in the plurality of network components is on a second network.

14. The medium as set forth in claim 13 wherein at least one of the second network component and the third network component is on a third network.

15. The medium as set forth in claim 11 wherein obtaining intrinsic metadata further comprises obtaining and executing a context object.

16. The medium as set forth in claim 15 wherein the context object further comprises at least one mobile code instruction to retrieve the intrinsic metadata.

17. The medium as set forth in claim 11 wherein combining the obtained intrinsic metadata with extrinsic metadata further comprises determining whether an identifier of a portion of the obtained intrinsic metadata matches another identifier of the extrinsic metadata.

18. The medium as set forth in claim 11 wherein combining the obtained intrinsic metadata with extrinsic metadata further comprises replacing a portion of the obtained intrinsic metadata with the extrinsic metadata, an identifier in the combined metadata identifying the extrinsic metadata instead of the replaced portion of the obtained intrinsic metadata.

19. The medium as set forth in claim 11 wherein combining the obtained intrinsic metadata with extrinsic metadata further comprises associating an identifier that identifies a portion of the obtained intrinsic metadata with the extrinsic metadata, the identifier identifying the portion of the obtained intrinsic metadata and the extrinsic metadata.

20. The medium as set forth in claim 11 wherein providing the combined metadata further comprises registering the combined metadata with at least one discovery protocol.

21. A system comprising:
 a first network component in a plurality of network components, the first network component having combined metadata formed from a combination of intrinsic metadata associated with a second network component and extrinsic metadata associated with the first network component, wherein the intrinsic metadata includes descriptive information for the second network component which resides within or is managed by the second network component;
 wherein a network component includes a network device or a network service;
 wherein the combined metadata is accessible to at least one of the plurality of network components by communication over a network, wherein an application executing on the at least one of the plurality of network components uses the combined metadata to determine the application's operating parameters.

22. The system as set forth in claim 21 wherein the at least one of the plurality of network components has a multi-layered metadata combination which includes the combined metadata and an additional layer of extrinsic metadata, the multi-layered metadata combination is accessible to the at least one of the plurality of network components.

23. The system as set forth in claim 21 wherein the first network component is on a first network, and at least one of the second network component and a third network component in the plurality of network components is on a second network.

24. The system as set forth in claim 23 wherein at least one of the second network component and the third network component is on a third network.

25. The system as set forth in claim 21 wherein the intrinsic metadata is accessible through a context object.

26. The system as set forth in claim 25 wherein the context object further comprises at least one mobile code instruction which when executed by the at least one of the plurality of network components enables the at least one network component to retrieve the intrinsic metadata.

27. The system as set forth in claim 21 wherein the combined metadata has an identifier of a portion of the obtained intrinsic metadata that matches another identifier of the extrinsic metadata.

28. The system as set forth in claim 21 wherein the combined metadata has an identifier which identifies the extrinsic metadata that replaces a portion of the intrinsic metadata.

29. The system as set forth in claim 21 wherein the combined metadata has an identifier which identifies a portion of the intrinsic metadata and the extrinsic metadata.

30. The system as set forth in claim 21 wherein the at least one of the plurality of network components has access to at least one discovery protocol, the combined metadata registered by the at least one network component with the at least one discovery protocol.

* * * * *

UNITED STATES PATENT AND TRADEMARK OFFICE
CERTIFICATE OF CORRECTION

| | | |
|---|---|---|
| PATENT NO. | : 7,133,872 B2 | Page 1 of 1 |
| APPLICATION NO. | : 10/290928 | |
| DATED | : November 7, 2006 | |
| INVENTOR(S) | : Warren Keith Edwards et al. | |

It is certified that error appears in the above-identified patent and that said Letters Patent is hereby corrected as shown below:

Title Page, Item (73) Assignee: should read

-- (73) Assignee: XEROX CORPORATION, Norwalk, Connecticut (US) --.

Signed and Sealed this

Second Day of October, 2012

David J. Kappos
*Director of the United States Patent and Trademark Office*